United States Patent
Wang et al.

(10) Patent No.: US 11,100,320 B2
(45) Date of Patent: Aug. 24, 2021

(54) IMAGE RECOGNITION METHOD AND APPARATUS

(71) Applicant: BOE TECHNOLOGY GROUP CO., LTD., Beijing (CN)

(72) Inventors: Tingting Wang, Beijing (CN); Yue Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 220 days.

(21) Appl. No.: 16/542,597

(22) Filed: Aug. 16, 2019

(65) Prior Publication Data

US 2020/0334457 A1 Oct. 22, 2020

(30) Foreign Application Priority Data

Apr. 16, 2019 (CN) .......................... 201910304829.3

(51) Int. Cl.
*G06K 9/00* (2006.01)
*G06N 20/00* (2019.01)
(Continued)

(52) U.S. Cl.
CPC ....... *G06K 9/00496* (2013.01); *G06K 9/6256* (2013.01); *G06N 3/08* (2013.01); *G06N 20/00* (2019.01)

(58) Field of Classification Search
CPC .......... G06N 3/08; G06N 3/0454; G06N 3/04; G06N 3/0445; G06N 20/00; G06N 3/063;
(Continued)

(56) References Cited

U.S. PATENT DOCUMENTS

| 10,430,946 | B1* | 10/2019 | Zhou | G06N 3/0454 |
| 2018/0181592 | A1* | 6/2018 | Chen | G06F 16/5838 |
| 2020/0175053 | A1* | 6/2020 | Zheng | G06N 3/0454 |

FOREIGN PATENT DOCUMENTS

| CN | 108229519 A | 6/2018 |
| CN | 108364023 A | 8/2018 |
| CN | 109598191 A | 4/2019 |

OTHER PUBLICATIONS

Qiu, Ze-Yu et al., "Regional Context-Aware Image Annotation", Chinese Journal of Computers, Jun. 2014, pp. 1390-1997, vol. 37, vol. 6.

(Continued)

*Primary Examiner* — Ajibola A Akinyemi
(74) *Attorney, Agent, or Firm* — The Webb Law Firm (57) ABSTRACT

This disclosure proposes an image recognition method and apparatus. The method comprises: obtaining an image to be recognized; inputting the image into a first preset block of a residual neural network, to obtain a first image feature corresponding to the image; inputting the first image feature into a second preset block of the residual neural network, an attention model, a first convolution layer, and a pooling layer arranged in this order, to obtain first label information corresponding to the image, which has a label correlation representation; inputting the first image feature into a second convolution layer and a bidirectional neural network arranged in this order, to obtain second label information corresponding to the image, which has a label correlation representation; and determining label information corresponding to the image in accordance with the first label information and the second label information.

20 Claims, 5 Drawing Sheets

(51) Int. Cl.
*G06N 3/08* (2006.01)
*G06K 9/62* (2006.01)

(58) Field of Classification Search
CPC ...... G06N 3/084; G06N 3/0481; G06N 20/20;
G06N 3/088; G06N 20/10; G06N 5/003;
G06N 3/0472; G06N 3/082; G06N 5/04;
G06N 7/005; G06N 3/006; G06N 3/008;
G06N 3/02; G06N 3/0436
USPC ......................................................... 382/181
See application file for complete search history.

(56) References Cited

OTHER PUBLICATIONS

Xu, Kelvin et al., "Show, Attend and Tell: Neural Image Caption Generation with Visual Attention", Proceedings of the 32nd International Conference on Machine Learning, 2015, vol. 37, Lille, France.

Zhu, Feng et al., Learning Spatial Regularization with Image-Level Supervisions for Multi-Label Image Classification, IEEE Xplore, 2017, pp. 2027-2036.

\* cited by examiner

IMAGE RECOGNITION METHOD AND APPARATUS

CROSS-REFERENCE TO RELATED APPLICATIONS

This application claims priority to Chinese Patent Application No. 201910304829.3, filed on Apr. 16, 2019, the contents of which are hereby incorporated by reference in their entirety for all purposes.

TECHNICAL FIELD

This disclosure relates to the technical field of image process, and particularly to an image recognition method and apparatus.

BACKGROUND

In the existing image recognition method, at the time of multi-label recognition, each label is regarded as independent and mutually irrelevant, and each label is recognized separately. But there generally are a fixed position relation and a correlation among multiple labels of the image. For example, a "sky" label is generally at an upper portion of the image, a "grassland' label is generally at an lower portion of the image, and the "sky" label and a "white cloud" label have a comparatively high correlation and often occur at the same time. However, the position relation and the correlation among the labels are not involved in the above-described image recognition method at the time of multi-label recognition, and hence it is difficult to accurately recognize a plurality of labels in the image, and the image recognition efficiency is poor.

SUMMARY

In accordance with a first aspect of this disclosure, an image recognition method is provided, which comprises:
obtaining an image to be recognized;
inputting the image into a first preset block of a residual neural network, to obtain a first image feature corresponding to the image;
inputting the first image feature into a second preset block of the residual neural network, an attention model, a first convolution layer, and a pooling layer arranged in this order, to obtain first label information corresponding to the image, which has a label correlation representation;
inputting the first image feature into a second convolution layer and a bidirectional neural network arranged in this order, to obtain second label information corresponding to the image, which has a label correlation representation; and
determining label information corresponding to the image in accordance with the first label information and the second label information.

In some embodiments, the attention model comprises: a position attention module and a channel attention module;
said inputting the first image feature into a second preset block of the residual neural network, an attention model, a first convolution layer, and a pooling layer arranged in this order, to obtain first label information corresponding to the image, which has a label correlation representation, comprises:
inputting the first image feature into the second preset block of the residual neural network, to obtain a second image feature;
inputting the second image feature into the position attention module and the channel attention module, respectively, to obtain an image feature with position representation and an image feature with channel representation;
fusing the image feature with position representation and the image feature with channel representation, to obtain a fused image feature; and
inputting the fused image feature into the first convolution layer and the pooling layer, to obtain the first label information.

In some embodiments, said inputting the first image feature into a second convolution layer and a bidirectional neural network arranged in this order, to obtain second label information corresponding to the image, which has a label correlation representation, comprises:
inputting the first image feature into a second convolution layer, to obtain a category attention map, wherein the category attention map comprises: an image feature corresponding to a category of an object in the image; and
inputting the category attention map into the bidirectional neural network, to obtain the second label information.

In some embodiments, said determining label information corresponding to the image in accordance with the first label information and the second label information comprises:
performing a weighted summation of the first label information and the second label information, to obtain the label information corresponding to the image.

In some embodiments, the image recognition method further comprises: before inputting the image into a first preset block of a residual neural network, to obtain a first image feature corresponding to the image,
obtaining training data comprising images whose number is larger than a preset number and corresponding real label information; and
training the residual neural network, the attention model, the first convolution layer, the pooling layer, the second convolution layer and the bidirectional neural network in accordance with the training data.

In some embodiments, said training the residual neural network, the attention model, the first convolution layer, the pooling layer, the second convolution layer and the bidirectional neural network in accordance with the training data comprises:
with respect to each image in the training data, obtaining the first label information corresponding to the image; calculating a first cross entropy in accordance with the first label information corresponding to the image and the real label information corresponding to the image; and adjusting coefficients of the residual neural network, the attention model, the first convolution layer and the pooling layer in accordance with the first cross entropy until the first cross entropy is in a stable state; and
in a case wherein the coefficients of the first preset block of the residual neural network are fixed, with respect to each image in the training data, obtaining the second label information corresponding to the image; calculating a second cross entropy in accordance with the second label information corresponding to the image and the real label information corresponding to the image; and adjusting coefficients of the second convolution layer and the bidirectional neural network in accordance with the second cross entropy until the second cross entropy is in a stable state.

In some embodiments, the image recognition method further comprises: after adjusting coefficients of the second convolution layer and the bidirectional neural network in accordance with the second cross entropy, with respect to each image in the training data, re-obtaining the first label information corresponding to the image and the second label information corresponding to the image;

recalculating the first cross entropy and the second cross entropy in accordance with the first label information and the second label information which are re-obtained and the real label information; and finely adjusting the coefficients of the residual neural network, the attention model, the first convolution layer, the pooling layer, the second convolution layer and the bidirectional neural network in accordance with the recalculated first cross entropy and the recalculated second cross entropy until a sum of the recalculated first cross entropy and the recalculated second cross entropy is in a stable state.

In some embodiments, the bidirectional neural network is a bidirectional long-short term memory network or a bidirectional recurrent neural network.

In some embodiments, the residual neural network comprises: 5 residual blocks;

the first preset block is the first four residual blocks in the residual neural network; and the second preset block is the fifth residual block in the residual neural network.

In some embodiments, the first image feature comprises a feature map derived from the image, and each of the first label information, the second label information, and the label information indicates a category of an object in the image.

In accordance with a second aspect of this disclosure, an image recognition apparatus is provided, which comprises a memory, a processor and a computer program stored on the memory and executable on the processor, wherein the processor implements the image recognition method as described above when executing the program.

In accordance with a third aspect of this disclosure, a non-transitory computer-readable storage medium is provided, which has stored thereon a computer program, which, when executed by a processor, implements the image recognition method as described above.

In accordance with a fourth aspect of this disclosure, a neural network processor is provided, which comprises:

a first preset block of a residual neural network configured to receive an image to be recognized and output a first image feature corresponding to the image;

a second preset block of the residual neural network, an attention model, a first convolution layer, and a pooling layer arranged in this order, configured to receive the first image feature and output first label information corresponding to the image, which has a label correlation representation; and a second convolution layer and a bidirectional neural network arranged in this order, configured to receive the first image feature and output second label information corresponding to the image, which has a label correlation representation, wherein label information corresponding to the image is determined in accordance with the first label information and the second label information.

In some embodiments, the attention model comprises: a position attention module and a channel attention module.

BRIEF DESCRIPTION OF THE DRAWINGS

The above and/or additional aspects and advantages of this disclosure will become apparent and readily appreciated from the following description of the embodiments, taken in conjunction with the accompanying drawings of which.

DETAILED DESCRIPTION

Reference will now be made in detail to the embodiments of this disclosure, examples of which are illustrated in the accompanying drawings, wherein same or similar reference numerals refer to same or similar elements or elements having same or similar functions throughout. The embodiments described below with reference to the drawings are exemplary, intended to explain this disclosure and should not be construed as limiting this disclosure.

The image recognition method and apparatus in accordance with the embodiments of this disclosure are described below with reference to the accompanying drawings.

Figure 1:
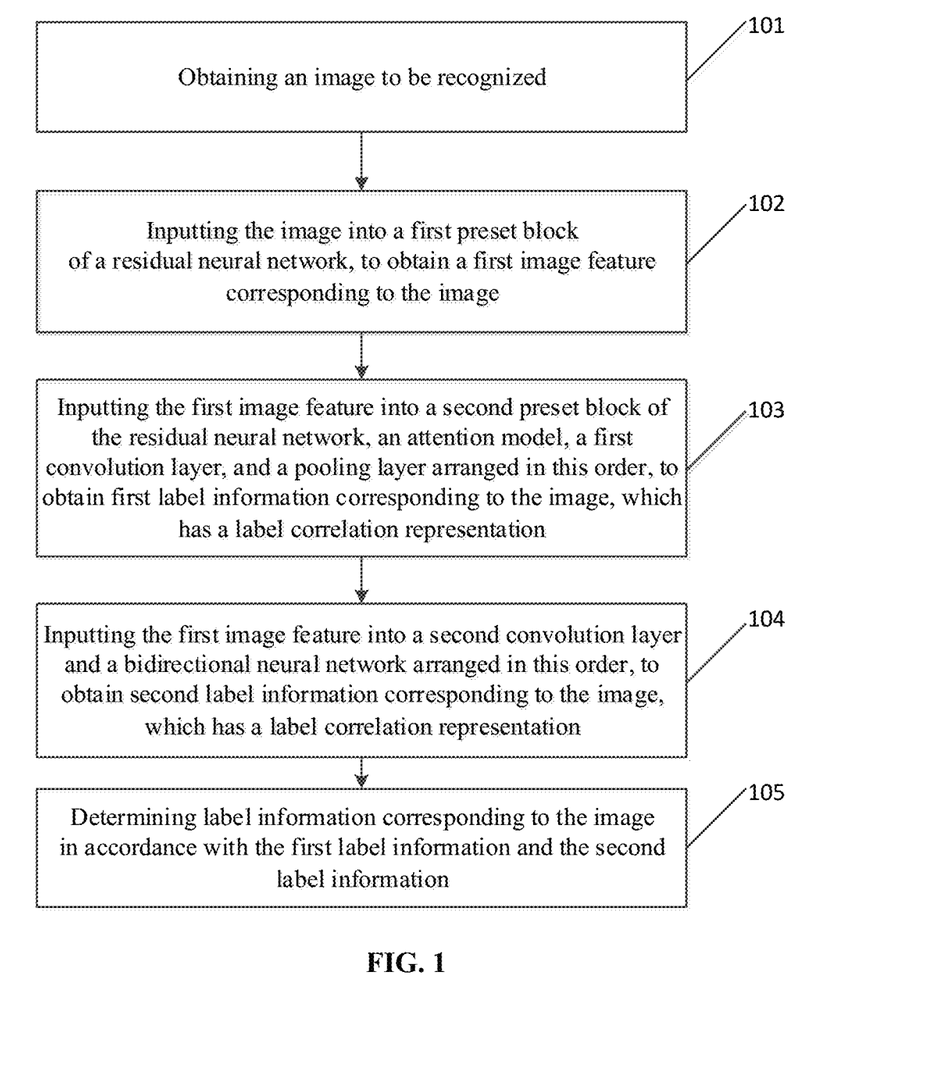
FIG. 1 is a schematic flowchart illustrating an image recognition method in accordance with some embodiments of this disclosure.

FIG. 1 is a schematic flowchart illustrating an image recognition method in accordance with some embodiments of this disclosure. As shown in FIG. 1, the image recognition method comprises the steps of:

S101, obtaining an image to be recognized.

The main body for performing the image recognition method provided by this disclosure is an image recognition apparatus. The image recognition apparatus specifically may be a hardware device such as a mobile terminal, a server, or the like, or software installed on the hardware device. In some embodiments, the image to be recognized may be, for example, an image having a plurality of labels, wherein the label indicates a category of an object in the image. For example, the labels are sky, grassland, white cloud, person, horse, etc.

S102, inputting the image into a first preset block of a residual neural network, to obtain a first image feature corresponding to the image.

In some embodiments, the residual neural network may include: 5 residual blocks. The first preset block is the first four residual blocks in the residual neural network; and the second preset block is the fifth residual block in the residual neural network. In some embodiments, the image is input into the residual neural network and sequentially passes through the first four residual blocks of the residual neural network, and the output of the fourth residual block is the first image feature. In some embodiments, the residual neural network may be a pre-trained residual neural network. It should be noted that the image feature involved in some embodiments includes a feature map derived from the image, and the image feature is represented in the form of matrix. The process of the image feature refers to the calculation process of the matrix.

S103, inputting the first image feature into a second preset block of the residual neural network, an attention model, a first convolution layer and a pooling layer which are arranged in this order, to obtain first label information corresponding to the image, which has a label correlation representation.

In some embodiments, the attention model may include: a position attention module and a channel attention module. Correspondingly, the image recognition apparatus may execute the process of the step 103 specifically as follows: inputting the first image feature into a second preset block of the residual neural network, to obtain a second image feature; inputting the second image feature into the position attention module and the channel attention module respectively, to obtain an image feature with position representation and an image feature with channel representation; fusing the image feature with position representation and the image feature with channel representation, to obtain a fused image feature; inputting the fused image feature to the first convolution layer and the pooling layer, to obtain first label information.

Figure 2:
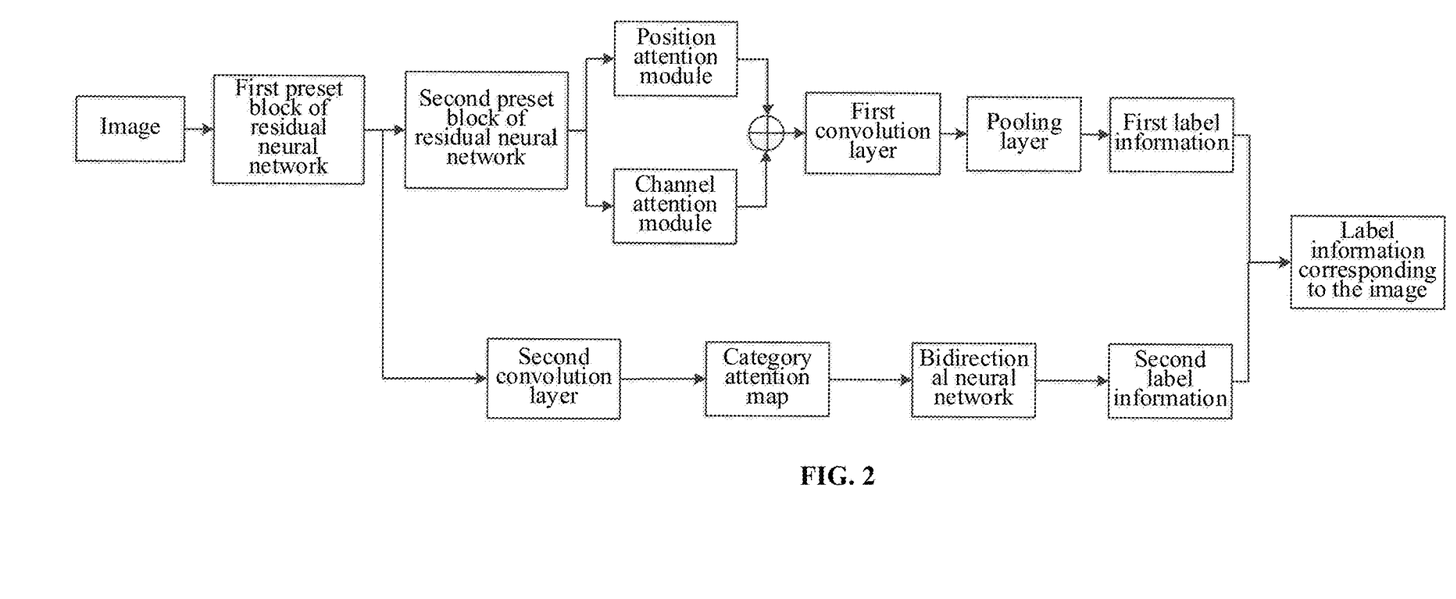
FIG. 2 is a schematic diagram illustrating a network model in accordance with some embodiments of this disclosure.

The position attention module and the channel attention module may be as shown in FIG. 2, which is a schematic diagram illustrating a network model in accordance with some embodiments of this disclosure. In FIG. 2, a backbone network and a branch network are connected after the first preset block of the residual neural network. The backbone network includes: the second preset block of the residual neural network, the attention model consisting of the position attention module and the channel attention module, the first convolution layer and the pooling layer. The branch network includes: a second convolution layer and a bidirectional neural network.

Figure 3:
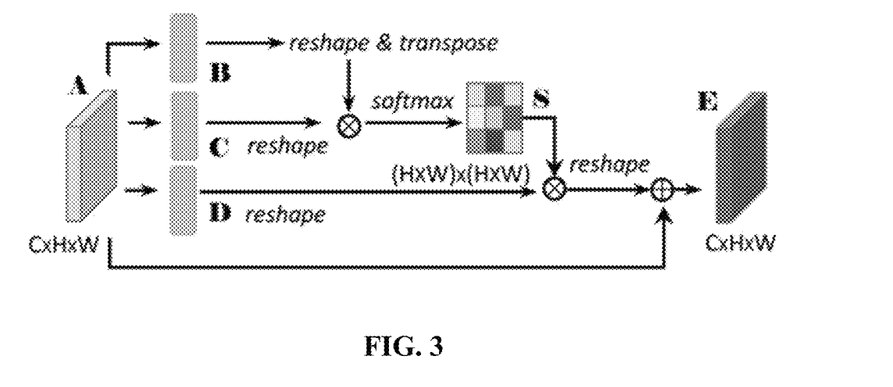
FIG. 3 is a structural diagram of a position attention module in accordance with some embodiments of this disclosure.

In some embodiments, the position attention module PAM is used to fuse the position relations among the plurality of labels in the second image feature, to obtain the image feature with position representation. FIG. 3 is a structural diagram of the position attention module in accordance with some embodiments of this disclosure. In FIG. 3, an association strength matrix between any two point features in the second image feature is calculated first. That is, the second image feature A is subjected to convolution and dimensionality reduction to obtain new features B and C representing spatial remote context information and a feature D representing respective point features, dimensions of the feature B and the feature C are changed, and then matrix multiplication is performed on the feature B and the feature C to obtain the association strength matrix between any two point features. Then the association strength matrix is normalized through a "softmax" operation to obtain an attention map S of each position relative to other positions, wherein the larger the response value is if there is larger similarity between two point features. Next, the feature D is weighted with use of the position attention map S for fusion, so that a global association is generated among the positions. Still next, a summation operation is performed on the weighted and fused feature and the second image feature A to obtain the image feature with position representation.

Figure 4:
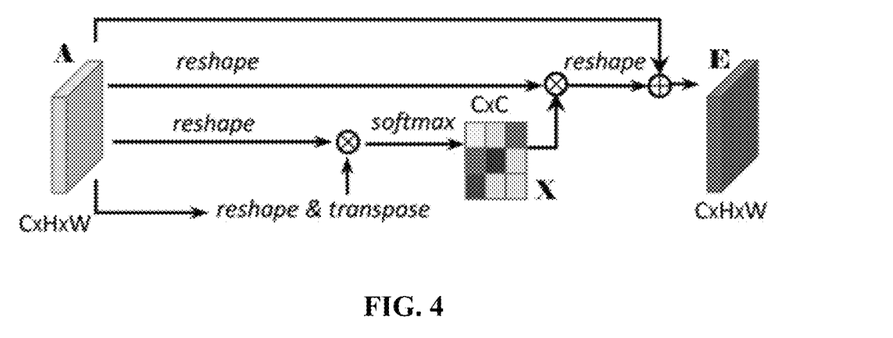
FIG. 4 is a structural diagram of a channel attention module in accordance with some embodiments of this disclosure.

In some embodiments, the channel attention module CAM is used to fuse the correlation among the plurality of labels in the second image feature, to obtain the image feature with channel representation. FIG. 4 is a structural diagram of the channel attention module in accordance with some embodiments of this disclosure. in FIG. 4, an association strength matrix between any two channels in the second image feature is first calculated; then a channel attention map is obtained through a "softmax" operation; and finally, weighting is made through the channel attention map for fusion such that a global association is generated among the channels to obtain the image feature with channel representation.

The image feature with position representation and the image feature with channel representation are matrixes, and the fusion of the image feature with position representation and the image feature with channel representation refers to a process of adding corresponding dimensions of the two matrixes. In some embodiments, the first convolution layer and the pooling layer are specifically used to perform a dimension reduction process on the fused image feature, to obtain the first label information. Taking a size of 14*14*1024 for the first image feature as an example, the first convolution layer may be a one-layer convolution having a convolution kernel size of 3*3*2048. The pooling layer may employ an average pooling of 3*3.

S104, inputting the first image feature into a second convolution layer and a bidirectional neural network arranged in this order, to obtain second label information corresponding to the image, which has a label correlation representation.

In some embodiments, the image recognition apparatus executes the process of the step 104 specifically as follows: inputting the first image feature into a second convolution layer, to obtain a category attention map, wherein the category attention map comprises: an image feature corresponding to a category of an object in the image; and inputting the category attention map into the bidirectional neural network, to obtain the second label information.

By taking the size of 14*14*1024 for the first image feature as an example, the second convolution layer may be a three-layer convolution having a convolution kernel size of 1*1*1024, 3*3*512, 1*1*K, respectively. By performing a dimensionality reduction process on the first image feature with use of the three-layer convolution, a category attention map is obtained. The size of the category attention map is 14*14*K, where K is the total number of the categories, and 14*14 is the dimension of the image feature corresponding to each category.

In some embodiments, the bidirectional neural network may be a Bidirectional Long-Short Term Memory (Bi-LSTM) network or a bidirectional Recurrent Neural Network (Bi-RNN). Among them, the bidirectional long-short term memory network is a temporal recursive neural network suitable for processing and predicting important events with relatively long intervals and delays in time series. The image features corresponding to respective categories in the category attention map are related and have dependencies. Such dependencies can be identified with use of the bidirectional long-short term memory network, so as to obtain the second label information, which has a label correlation representation.

S105, determining label information corresponding to the image in accordance with the first label information and the second label information.

In some embodiments, the image recognition apparatus may perform the process of the step 105 specifically as follows: performing a weighted summation of the first label information and the second label information, to obtain the label information corresponding to the image. The weighted summation may be the weighted summation in accordance with a weight of the first label information and a weight of the second label information, or may be averaging the first label information and the second label information, so as to obtain the label information corresponding to the image.

The image identification method in accordance with the embodiments of this disclosure can carry out multi-label recognition on the image by considering the position relation and the correlation among the labels, so as to accurately recognize the plurality of labels in the image, and improve the image recognition efficiency.

Figure 5:
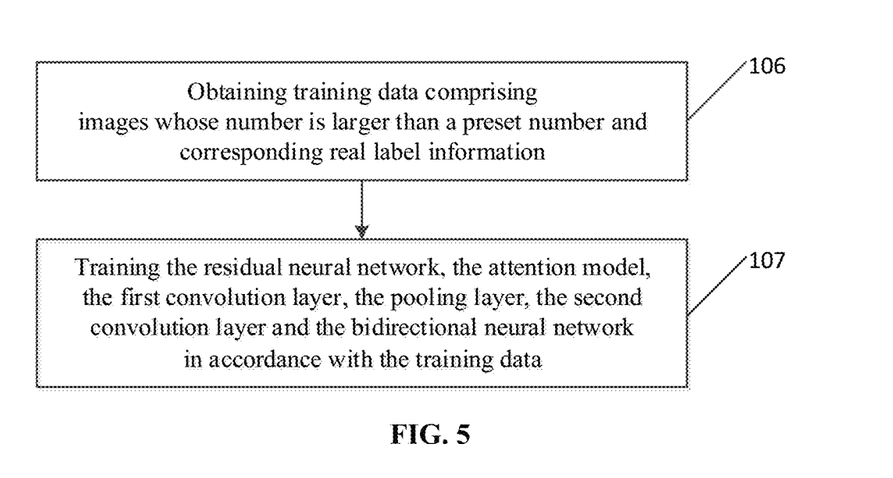
FIG. 5 is a schematic flowchart illustrating another image recognition method in accordance with some embodiments of this disclosure.

FIG. 5 is a schematic flowchart illustrating another image recognition method in accordance with some embodiments of this disclosure. As shown in FIG. 5, prior to the step 101 on the basis of FIG. 1, the method may further comprise the steps of:

S106, obtaining training data comprising images whose number is larger than a preset number and corresponding real label information; and S107, training the residual neural network, the attention model, the first convolution layer, the pooling layer, the second convolution layer and the bidirectional neural network in accordance with the training data.

In some embodiments, the image recognition apparatus may perform the process of the step 107 specifically as follows: with respect to each image in the training data, obtaining the first label information corresponding to the image; calculating a first cross entropy in accordance with the first label information corresponding to the image and the real label information corresponding to the image; and adjusting coefficients of the residual neural network, the attention model, the first convolution layer and the pooling layer in accordance with the first cross entropy until the first cross entropy is in a stable state; and in a case wherein the coefficients of the first preset block of the residual neural network are fixed, with respect to each image in the training data, obtaining the second label information corresponding to the image; calculating a second cross entropy in accordance with the second label information corresponding to the image and the real label information corresponding to the image; and adjusting coefficients of the second convolution layer and the bidirectional neural network in accordance with the second cross entropy until the second cross entropy is in a stable state. The formula for calculating the cross entropy may be, for example, as shown in the following formula (1):

$$\text{Loss} = -\sum_{l=1}^{K} p^l \log \hat{p}^l + (1-p^l)\log(1-\hat{p}^l) \quad (1)$$

wherein Loss represents a cross entropy; $p^1$ is a real probability (ground truth) of the label of a first category in the real label information; $\hat{p}^1$ is a predicted probability of the label of the first category in the first label information or the second label information; K represents a total number of the label categories.

Further, in some embodiments, after adjusting coefficients of the second convolution layer and the bidirectional neural network in accordance with the second cross entropy, the method may further comprise the following steps: with respect to each image in the training data, re-obtaining the first label information corresponding to the image and the second label information corresponding to the image; recalculating the first cross entropy and the second cross entropy in accordance with the first label information and the second label information which are re-obtained and the real label information; and finely adjusting the coefficients of the residual neural network, the attention model, the first convolution layer, the pooling layer, the second convolution layer and the bidirectional neural network in accordance with the recalculated first cross entropy and the recalculated second cross entropy until a sum of the recalculated first cross entropy and the recalculated second cross entropy is in a stable state.

In some embodiments, firstly, the residual neural network and the backbone network are trained with use of the training data; the branch network is trained with the coefficient of the first preset block of the residual neural network fixed; and then the coefficients of the whole network model are finely adjusted. As compared with integrally training the whole network model with use of the training data, the accuracy of the whole network model can be significantly improved, and the accuracy of image recognition is improved.

Figure 6:
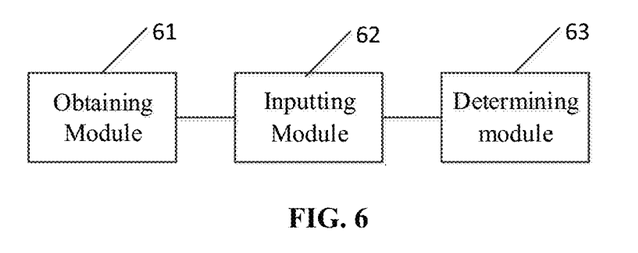
FIG. 6 is a schematic diagram illustrating a structure of an image recognition apparatus in accordance with some embodiments of this disclosure.

FIG. 6 is a schematic diagram illustrating a structure of an image recognition apparatus in accordance with some embodiments of this disclosure. As shown in FIG. 6, the image recognition apparatus comprises: an obtaining module 61, an inputting module 62 and a determining module 63.

The obtaining module 61 is configured to obtain an image to be recognized.

The inputting module 62 is configured to input the image into a first preset block of the residual neural network, to obtain a first image feature corresponding to the image. The inputting module 62 is further configured to input the first image feature into a second preset block of the residual neural network, an attention model, a first convolution layer, and a pooling layer arranged in this order, to obtain first label information corresponding to the image, which has a label correlation representation. The inputting module 62 is still further configured to input the first image feature into a second convolution layer and a bidirectional neural network arranged in this order, to obtain second label information corresponding to the image, which has a label correlation representation.

The determining module 63 is configured to determine label information corresponding to the image in accordance with the first label information and the second label information.

The image recognition apparatus provided by this disclosure may specifically be a hardware device such as a mobile terminal, a server, or the like, or software installed on the hardware device. In some embodiments, the image to be recognized may be, for example, an image having a plurality of labels. For example, the labels may be sky, grassland, white cloud, person, horse, etc.

In some embodiments, the residual neural network may include 5 residual blocks, wherein the first preset block is the first four residual blocks in the residual neural network; and the second preset block is the fifth residual block in the residual neural network. In some embodiments, the image is input into the residual neural network, and sequentially passes through the first four residual blocks of the residual neural network, and the output of the fourth residual block is the first image feature. In some embodiments, the residual neural network may be a pre-trained residual neural network. It should be noted that the image feature involved in some embodiments is represented in the form of matrix. The process of the image feature refers to the calculation process of the matrix.

In some embodiments, the attention model may include: a position attention module and a channel attention module. Correspondingly, the inputting module 62 may be specifically used for inputting the first image feature into the second preset block of the residual neural network, to obtain a second image feature; inputting the second image feature into the position attention module and the channel attention module, respectively, to obtain an image feature with position representation and an image feature with channel representation; fusing the image feature with position representation and the image feature with channel representation, to obtain a fused image feature; and inputting the fused image feature into the first convolution layer and the pooling layer, to obtain the first label information.

The position attention module and the channel attention module may be as shown in FIG. 2, which is a schematic diagram illustrating a network model in accordance with some embodiments of this disclosure. In FIG. 2, a backbone network and a branch network are connected after the first preset block of the residual neural network; the backbone network includes: the second preset block of the residual neural network, the attention model consisting of the position attention module and the channel attention module, the first convolution layer and the pooling layer.

In some embodiments, the position attention module PAM is used to fuse position relations among the plurality of labels in the second image feature, to obtain the image feature with position representation. The channel attention module CAM is used to fuse the correlation among the plurality of labels in the second image feature, to obtain the image feature with channel representation.

The image feature with position representation and the image feature with channel representation are matrixes, and the fusion of the image feature with position representation and the image feature with channel representation refers to the process of adding corresponding dimensions of the two matrixes. In some embodiments, the first convolution layer and the pooled layer are specifically configured to perform a dimensionality reduction process on the fused image feature, to obtain the first label information.

Further, in some embodiments, the inputting module 62 may be specifically used for inputting the first image feature into the second convolution layer to obtain a category attention map, wherein the category attention map includes: an image feature corresponding to a category of an object in the image; and inputting the category attention map to the bidirectional neural network, to obtain the second label information, which has a label correlation representation.

In some embodiments, the determining module 63 may be specifically configured to perform a weighted summation of the first label information and the second label information, to obtain the label information corresponding to the image. The weighted summation may be performed in accordance with a weight of the first label information and a weight of the second label information, or may be performed by averaging the first label information and the second label information, so as to obtain the label information corresponding to the image.

The image recognition apparatus in accordance with the embodiments of this disclosure can carry out multi-label recognition of the image by considering the position relations and the correlation among the labels, so that a plurality of labels in the image can be accurately recognized, and the image recognition efficiency can be improved.

Figure 7:
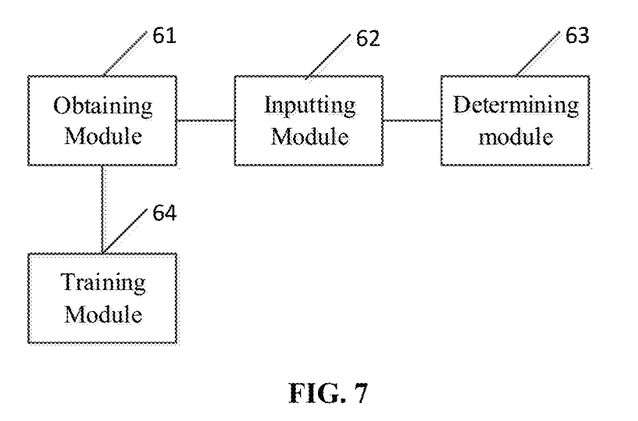
FIG. 7 is a schematic diagram illustrating a structure of another image recognition apparatus in accordance with some embodiments of this disclosure.

FIG. 7 is a schematic diagram illustrating a structure of another image recognition apparatus in accordance with some embodiments of this disclosure. As shown in FIG. 7, on the basis of FIG. 6, the apparatus further comprises a training module 64.

The obtaining module 61 is further configured to obtain training data, wherein the training data includes: images whose number is larger than a preset number and corresponding real label information.

The training module 64 is configured to train the residual neural network, the attention model, the first convolution layer, the pooling layer, the second convolution layer, and the bidirectional neural network in accordance with the training data.

In some embodiments, the training module 64 may be specifically used for, with respect to each image in the training data, obtaining the first label information corresponding to the image; calculating a first cross entropy in accordance with the first label information corresponding to the image and the real label information corresponding to the image; and adjusting coefficients of the residual neural network, the attention model, the first convolution layer and the pooling layer in accordance with the first cross entropy until the first cross entropy is in a stable state; and in a case wherein the coefficients of the first preset block of the residual neural network are fixed, with respect to each image in the training data, obtaining the second label information corresponding to the image; calculating a second cross entropy in accordance with the second label information corresponding to the image and the real label information corresponding to the image; and adjusting coefficients of the second convolution layer and the bidirectional neural network in accordance with the second cross entropy until the second cross entropy is in a stable state.

Further, in some embodiments, after adjusting coefficients of the second convolution layer and the bidirectional neural network in accordance with the second cross entropy, the training module 64 may be specifically used for: with respect to each image in the training data, re-obtaining the first label information corresponding to the image and the second label information corresponding to the image; recalculating the first cross entropy and the second cross entropy in accordance with the first label information and the second label information which are re-obtained and the real label information; and finely adjusting the coefficients of the residual neural network, the attention model, the first convolution layer, the pooling layer, the second convolution layer and the bidirectional neural network in accordance with the recalculated first cross entropy and the recalculated second cross entropy until a sum of the recalculated first cross entropy and the recalculated second cross entropy is in a stable state.

This disclosure further provides an image recognition apparatus including: a memory, a processor and a computer program stored on the memory and executable on the processor, wherein the processor implements the image recognition method as described above when executing the program.

Figure 8:
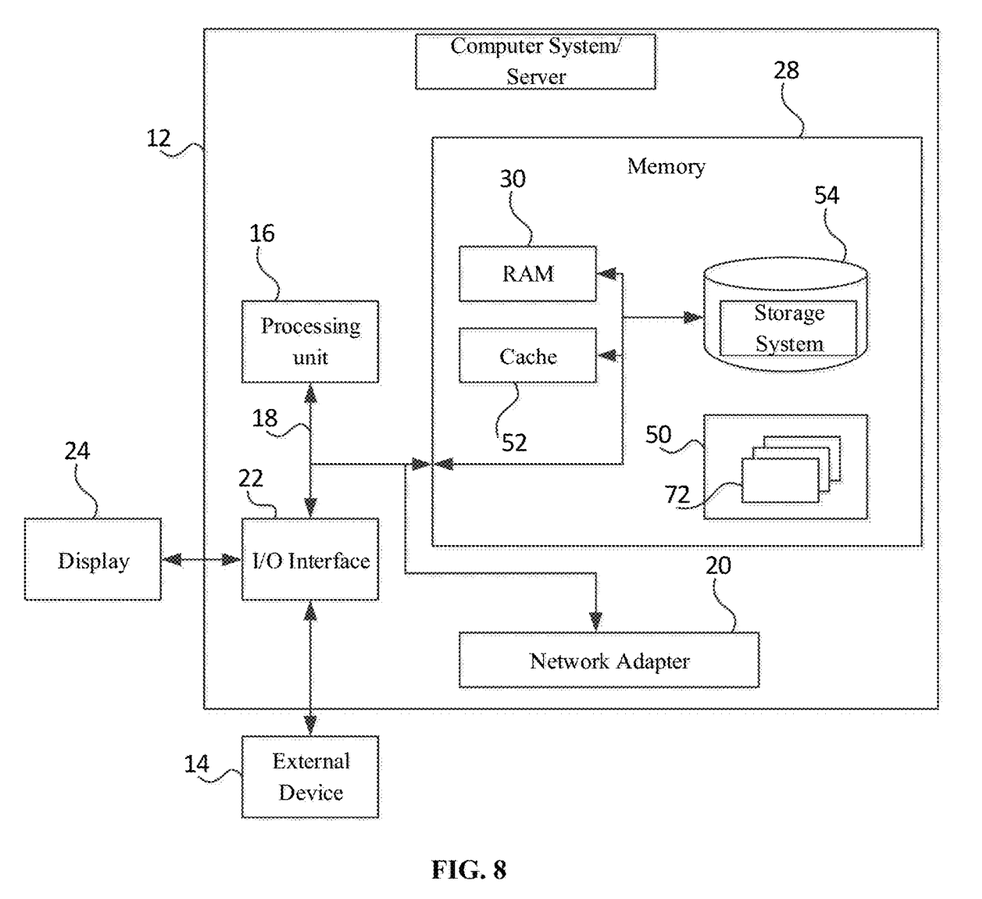
FIG. 8 is a schematic diagram illustrating a structure of a computer device in accordance with some embodiments of this disclosure.

FIG. 8 is a block diagram illustrating an exemplary computer device suitable for implementing the embodiments of the present application. The computer device 12 shown in FIG. 8 is only one example and should not be construed as limiting the scope of use or functionality of the embodiments of the present application in any way.

As shown in FIG. 8, the computer device 12 is embodied in the form of a general purpose computing device. Components of the computer device 12 may include, but are not limited to: one or more processors or processing units 16, a system memory 28, and a bus 18 that connects various system components including the system memory 28 and the processing unit 16.

The bus 18 represents one or more of several types of bus structures, including a memory bus or memory controller, a peripheral bus, a graphical acceleration port, a processor, or a local bus using any of a variety of bus structures. By way of example, such architectures include, but are not limited to, Industry Standard Architecture (ISA) bus, Micro Channel Architecture (MAC) bus, enhanced ISA bus, Video Electronics Standards Association (VESA) local bus, and Peripheral Component Interconnect (PCI) bus.

The computer device 12 typically includes a variety of computer system readable medium. Such medium can be any available medium that can be accessed by the computer device 12 and include both volatile and nonvolatile medium, removable and non-removable medium.

The memory 28 may include computer system readable medium in the form of volatile memory, such as Random Access Memory (RAM) 30 and/or cache memory 52. The computer device 12 may further include other removable/non-removable, volatile/nonvolatile computer system storage medium. By way of example only, the storage system 54 may be used to read from and write to non-removable, nonvolatile magnetic medium (not shown in FIG. 8, commonly referred to as "hard disk drive"). Although not shown in FIG. 8, a magnetic disk drive may be provided for reading from and writing to a removable nonvolatile magnetic disk (e.g., a "floppy disk"), as well as an optical disk drive for reading from and writing to a removable nonvolatile optical disk (e.g., a Compact Disc Read Only Memory (CD-ROM), a Digital Video Disc Read Only Memory (DVD-ROM), or other optical medium). In such cases, each drive may be connected to the bus 18 by one or more data media interfaces. The memory 28 may include at least one program product having a set of (e.g., at least one) program modules configured to perform the functions of the various embodiments of the present application.

A program/utility 50 having a set of (at least one) program modules 72, including but not limited to an operating system, one or more application programs, other program modules, and program data, each or some combination of which may include an implementation of a network environment, may be stored, for example, in the memory 28. Program modules 72 typically perform the functions and/or methods in the embodiments described herein.

The computer device 12 may also communicate with one or more external devices 14 (e.g., keyboard, pointing device, display 24, etc.), one or more devices that enable a user to interact with the computer system/server 12, and/or any device that enables the computer system/server 12 to communicate with one or more other computing devices (e.g., a network card, modem, etc.). Such communication may occur through an input/output (I/O) interface 22. Moreover, the computer device 12 may also communicate with one or more networks (e.g., a Local Area Network (LAN), a Wide Area Network (WAN) and/or a public network such as the Internet) via the network adapter 20. As shown, the network adapter 20 communicates with other modules of the computer device 12 over the bus 18. It should be understood that although not shown in the figure, other hardware and/or software modules may be used in conjunction with the computer device 12, including but not limited to: microcode, a device driver, a redundant processing unit, an external disk drive array, a RAID system, a tape drive, and a data backup storage system, or the like.

The processing unit 16 executes various functional applications and data process, for example, implementing the methods mentioned in the foregoing embodiments, by executing programs stored in the system memory 28.

This disclosure further provides a non-transitory computer-readable storage medium having stored thereon a computer program that, when executed by a processor, implements the image recognition method as described above.

In the description of the present specification, the terms "one embodiment," "some embodiments," "an example," "a specific example," or "some examples," etc., mean that a particular feature, structure, material, or characteristic described in conjunction with the embodiment or example is included in at least one embodiment or example of this disclosure. In this specification, schematic representations of the above terms are not necessarily directed to the same embodiment or example. Furthermore, the particular feature, structure, material, or characteristic described may be combined in any suitable manner in any one or more embodiments or examples. Furthermore, those skilled in the art may join and combine the different embodiments or examples described in this specification and the features of the different embodiments or examples without conflicts.

Furthermore, the terms "first" and "second" are used for descriptive purposes only and are not to be construed as indicating or implying a relative importance or implicitly indicating the number of technical features indicated. Thus, a feature defined with "first" or "second" may expressly or implicitly include at least one such feature. In the description of this disclosure, "plurality" means at least two, for example, two, three, etc., unless specifically defined otherwise.

Any process or method descriptions in the flowcharts or otherwise described herein may be understood to represent modules, segments, or portions of code which include one or more executable instructions for implementing customized logical functions or steps of process, and the scope of the preferred embodiments of this disclosure includes additional implementations in which functions may be executed out of the order shown or discussed, including substantially concurrently or in reverse order, depending on the functions involved, as would be understood by those skilled in the art.

The logic and/or steps shown in the flowcharts or otherwise described herein, for example, can be construed as an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In this specification, a "computer-readable medium" can be any device that can contain, store, communicate, propagate, or transport programs for use by or in connection with the instruction execution system, apparatus, or device. More specific examples (a non-exhaustive list) of the computer-readable medium would include the following: an electrical connection (electronic device) having one or more wiring, a portable computer disk cartridge (magnetic device), a Random Access Memory (RAM), a read-only memory (ROM), an erasable programmable read-only memory (EPROM or flash memory), an optical fiber device, and a portable compact disc read-only memory (CDROM). In addition, the computer-readable medium may even be paper or another suitable medium upon which the program is printed, as the program can be electronically captured, via, for instance, optical scanning of the paper or other medium, then compiled, interpreted, or otherwise processed in a suitable manner, if necessary, and then stored in the computer memory.

It is to be understood that portions of this disclosure may be implemented in hardware, software, firmware, or a combination thereof. In the above embodiments, the steps or methods may be implemented in software or firmware stored in a memory and executed by a suitable instruction execution system. If implemented in hardware, as in another embodiment, any one or a combination of the following techniques may be used as is known in the art: discrete logic circuits having logic gates for implementing logic functions on data signals, application specific integrated circuits having suitable combined logic gates, Programmable Gate Arrays (PGAs), Field Programmable Gate Arrays (FPGAs), and the like.

Those skilled in the art will appreciate that all or a portion of the steps carried by a method implementing the above-described embodiments may be implemented by a program that is stored on a computer-readable storage medium and that, when executed, causes the related hardware to perform one or a combination of the steps of the method embodiments.

In addition, each functional unit in the embodiments of this disclosure may be integrated into one processing module, or each unit may exist alone physically, or two or more units may be integrated into one module. The integrated module may be implemented in the form of hardware, or may be implemented in the form of a software functional module. The integrated module may also be stored in a computer-readable storage medium if it is implemented in the form of a software functional module and sold or used as a stand-alone product.

The above mentioned storage medium may be a read only memory, a magnetic or optical disk, etc. Although embodiments of this disclosure have been shown and described above, it will be understood that the above embodiments are illustrative and do not limit this disclosure, and that changes, modifications, substitutions and alterations to the above embodiments may be made by those skilled in the art within the scope of this disclosure.

What is claimed is:

1. An image recognition method, comprising:
   obtaining an image to be recognized;
   inputting the image into a first preset block of a residual neural network, to obtain a first image feature corresponding to the image;
   inputting the first image feature into a second preset block of the residual neural network, an attention model, a first convolution layer, and a pooling layer arranged in order, to obtain first label information corresponding to the image, which has a label correlation representation;
   inputting the first image feature into a second convolution layer and a bidirectional neural network arranged in order, to obtain second label information corresponding to the image, which has the label correlation representation; and
   determining label information corresponding to the image in accordance with the first label information and the second label information.

2. The method according to claim 1, wherein the attention model comprises: a position attention module and a channel attention module;
   wherein said inputting the first image feature into the second preset block of the residual neural network, the attention model, a first convolution layer, and the pooling layer arranged in order, to obtain first label information corresponding to the image, which has the label correlation representation, comprises:
   inputting the first image feature into the second preset block of the residual neural network, to obtain a second image feature;
   inputting the second image feature into the position attention module and the channel attention module, respectively, to obtain an image feature with position representation and an image feature with channel representation;
   fusing the image feature with position representation and the image feature with channel representation, to obtain a fused image feature; and
   inputting the fused image feature into the first convolution layer and the pooling layer, to obtain the first label information.

3. An image recognition apparatus comprising:
   a memory, a processor and a computer program stored on the memory and executable on the processor, wherein the processor implements the image recognition method according to claim 2 when executing the program.

4. The method according to claim 1, wherein said inputting the first image feature into the second convolution layer and the bidirectional neural network arranged in order, to obtain the second label information corresponding to the image, which has the label correlation representation, comprises:
   inputting the first image feature into the second convolution layer, to obtain a category attention map, wherein the category attention map comprises: an image feature corresponding to a category of an object in the image; and
   inputting the category attention map into the bidirectional neural network, to obtain the second label information.

5. An image recognition apparatus comprising:
   a memory, a processor and a computer program stored on the memory and executable on the processor, wherein the processor implements the image recognition method according to claim 4 when executing the program.

6. The method according to claim 1, wherein said determining label information corresponding to the image in accordance with the first label information and the second label information comprises:
   performing a weighted summation of the first label information and the second label information, to obtain the label information corresponding to the image.

7. An image recognition apparatus comprising:
   a memory, a processor and a computer program stored on the memory and executable on the processor, wherein the processor implements the image recognition method according to claim 6 when executing the program.

8. The method according to claim 1, further comprising:
   before inputting the image into a first preset block of the residual neural network, to obtain a first image feature corresponding to the image,
   obtaining training data comprising images whose number is larger than a preset number and corresponding real label information; and
   training the residual neural network, the attention model, the first convolution layer, the pooling layer, the second convolution layer and the bidirectional neural network in accordance with the training data.

9. The method according to claim 8, wherein said training the residual neural network, the attention model, the first convolution layer, the pooling layer, the second convolution layer and the bidirectional neural network in accordance with the training data comprises:

with respect to each image in the training data, obtaining the first label information corresponding to the image; calculating a first cross entropy in accordance with the first label information corresponding to the image and the real label information corresponding to the image; and adjusting coefficients of the residual neural network, the attention model, the first convolution layer and the pooling layer in accordance with the first cross entropy until the first cross entropy is in a stable state; and in a case wherein the coefficients of the first preset block of the residual neural network are fixed, with respect to each image in the training data, obtaining the second label information corresponding to the image; calculating a second cross entropy in accordance with the second label information corresponding to the image and the real label information corresponding to the image; and adjusting coefficients of the second convolution layer and the bidirectional neural network in accordance with the second cross entropy until the second cross entropy is in a stable state.

10. An image recognition apparatus comprising:

a memory, a processor and a computer program stored on the memory and executable on the processor, wherein the processor implements the image recognition method according to claim 8 when executing the program.

11. The method according to claim 9, further comprising: after adjusting coefficients of the second convolution layer and the bidirectional neural network in accordance with the second cross entropy, with respect to each image in the training data, re-obtaining the first label information corresponding to the image and the second label information corresponding to the image;

recalculating the first cross entropy and the second cross entropy in accordance with the first label information and the second label information which are re-obtained and the real label information; and finely adjusting the coefficients of the residual neural network, the attention model, the first convolution layer, the pooling layer, the second convolution layer and the bidirectional neural network in accordance with the recalculated first cross entropy and the recalculated second cross entropy until a sum of the recalculated first cross entropy and the recalculated second cross entropy is in a stable state.

12. An image recognition apparatus comprising:

a memory, a processor and a computer program stored on the memory and executable on the processor, wherein the processor implements the image recognition method according to claim 9 when executing the program.

13. An image recognition apparatus comprising:

a memory, a processor and a computer program stored on the memory and executable on the processor, wherein the processor implements the image recognition method according to claim 11 when executing the program.

14. The method according to claim 1, wherein the bidirectional neural network is a bidirectional long-short term memory network or a bidirectional recurrent neural network.

15. The method according to claim 1, wherein the residual neural network comprises: 5 residual blocks;

the first preset block is the first four residual blocks in the residual neural network; and the second preset block is a fifth residual block in the residual neural network.

16. The method according to claim 1, wherein the first image feature comprises a feature map derived from the image, and each of the first label information, the second label information, and the label information indicates a category of an object in the image.

17. An image recognition apparatus comprising:

a memory, a processor and a computer program stored on the memory and executable on the processor, wherein the processor implements the image recognition method according to claim 1 when executing the program.

18. A non-transitory computer-readable storage medium having stored thereon a computer program, which, when executed by a processor, implements the image recognition method according to claim 1.

19. A neural network processor, comprising:

a first preset block of a residual neural network executable on one or more processors, configured to receive an image to be recognized and output a first image feature corresponding to the image;

a second preset block of the residual neural network, an attention model, a first convolution layer, and a pooling layer arranged in order executable on the one or more processors, configured to receive the first image feature and output first label information corresponding to the image, which has a label correlation representation; and a second convolution layer and a bidirectional neural network arranged in order executable on the one or more processors, configured to receive the first image feature and output second label information corresponding to the image, which has a label correlation representation, wherein label information corresponding to the image is determined in accordance with the first label information and the second label information.

20. The neural network processor according to claim 19, wherein the attention model comprises: a position attention module and a channel attention module.

* * * * *